(12) United States Patent
Koizumi et al.

(10) Patent No.: US 6,911,103 B2
(45) Date of Patent: Jun. 28, 2005

(54) THERMOPLASTIC ELASTOMER COMPOSITION, INSULATING GLASS USING THE COMPOSITION, PROCESS FOR PRODUCING THE INSULATING GLASS AND NOZZLE FOR PRODUCING THE INSULATING GLASS

(75) Inventors: Yukio Koizumi, Kanagawa (JP); Jiro Watanabe, Kanagawa (JP); Hidekazu Takeyama, Kanagawa (JP); Shigeru Yamauchi, Kanagawa (JP); Toru Serizawa, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 276 days.

(21) Appl. No.: 10/270,069

(22) Filed: Oct. 15, 2002

(65) Prior Publication Data

US 2003/0219583 A9 Nov. 27, 2003

Related U.S. Application Data

(62) Division of application No. 09/639,889, filed on Oct. 19, 1999, now Pat. No. 6,491,992.

(30) Foreign Application Priority Data

Oct. 20, 1998 (JP) ............................................. 10-298939
Nov. 25, 1998 (JP) ............................................. 10-334358

(51) Int. Cl.$^7$ ........................... C03C 27/00; E06B 3/24; B29D 5/00
(52) U.S. Cl. ....................... 156/109; 264/252; 264/261; 264/263
(58) Field of Search ................................. 156/107, 109; 264/252, 261, 263

(56) References Cited

U.S. PATENT DOCUMENTS 5,136,974 A  *  8/1992  Lisec ........................ 118/673

FOREIGN PATENT DOCUMENTS

| JP | 10-110072 | 4/1998 |
| JP | 10-114551 | 5/1998 |
| JP | 10-114552 | 5/1998 |
| JP | 10-158041 | 6/1998 |

* cited by examiner

Primary Examiner—Donald J. Loney
(74) Attorney, Agent, or Firm—Rader, Fishman & Grauer PLLC

(57) ABSTRACT

A thermoplastic elastomer composition produced from a thermoplastic resin and rubber and having a dispersion phase formed of a rubber composition at least part of which is dynamically crosslinked in the continuous phase of the thermoplastic resin, insulating glass using the thermoplastic elastomer composition as a sealing material and spacer, a process for producing the insulating glass using a sealing material made from the thermoplastic elastomer composition, comprising the steps of inserting the leading end of a charging nozzle into a space between the peripheral portions of a plurality of glass sheets, discharging the sealing material from the leading end of the nozzle body at a predetermined rate, and moving the glass sheets or the nozzle body relative to each other to charge the sealing material made from the thermoplastic elastomer composition into the space between the peripheral portions of the glass sheets, and a nozzle used in this process.

3 Claims, 4 Drawing Sheets

THERMOPLASTIC ELASTOMER COMPOSITION, INSULATING GLASS USING THE COMPOSITION, PROCESS FOR PRODUCING THE INSULATING GLASS AND NOZZLE FOR PRODUCING THE INSULATING GLASS

This application is a divisional application of Ser. No. 09/639,889 filed Oct. 19, 1999, now U.S. Pat. No. 6,491,992.

BACKGROUND OF THE INVENTION

1. Field of the Invention

The present invention relates to a thermoplastic elastomer composition having excellent steam permeation resistance and heat distortion resistance, insulating glass using the composition as a sealing material and spacer, a process for producing the insulating glass and a nozzle for producing the insulating glass.

2. Prior Art

Heretofore, there has been known insulating glass constituted such that a sealing material having a predetermined width is charged into a space between the peripheral portions of at least two glass sheets which are opposed to each other in parallel and the hollow layer between the glass sheets is isolated from the outside air for the purpose of an improvement of heat insulating properties, dew condensation prevention properties and the like.

This insulating glass has been produced as follows, for example. As shown in FIG. 7, an aluminum spacer 73 filled with a desiccating agent 72 is placed in a space between the peripheral portions of two glass sheets 71a and 71b which are opposed to each other in parallel and held by a jig or the like to fix a predetermined interval between the glass sheets. Thereafter, a primary sealing material 74 is charged into spaces between the both side surfaces of the spacer 73 and the glass sheets 71a and 71b, and a two-liquid mixing and normal temperature curable type secondary sealing material 75, for example by a polysulfide- or silicone-based sealing material, is charged into a space between the spacer 73 and the opening side of the glass sheets 71 and 71b.

Japanese Patent Application Laid-Open No. Hei 10-158041 discloses a insulating glass production process and apparatus. In the process and apparatus, a plurality of glass sheets are held in a perpendicular direction so that the plurality of glass sheets can be simultaneously moved in the same direction at the same speed, the glass sheets and a die are moved in different unidirections which are perpendicular to each other, the glass sheets and the die are moved relative to each other alternately such that the glass sheets are stopped when the die is moved, and vice versa, and a resin material is extruded onto the peripheral portions of the glass sheets opposed to each other by moving the glass sheets and the die alternately for each side of the glass sheets.

However, since the former production process is carried out by using a jig, spacer and the like, the work becomes complicated and takes much time and labor. On the other hand, the latter process has such a problem that it is difficult to obtain insulating glass having good appearance because the resin material cannot be paved nicely when it is extruded.

In the insulating glass using the normal temperature curable sealing material in the prior art processes, it takes time to cure the sealing material and a final product cannot be promptly shipped. Especially in winter, the sealing material must be placed in a heating chamber for curing.

Therefore, it is desired to improve productivity by simplifying the process for producing insulating glass and shortening the cure time.

In contrast to this, Japanese Patent Application Laid-Open Nos. Hei 10-110072, Hei 10-114551, Hei 10-114552 and the like propose an invention in which a resin containing a desiccating agent as required is used as a spacer and sealing material in place of the aluminum spacer. The spacer/sealing material proposed in these publications is a composition containing butyl-based rubber and crystalline polyolefin which are preferably mixed at a high temperature.

In insulating glass using this composition, the composition serves as a resin spacer and a sealing material. Insulating glass can be produced in which the peripheral portions of the glass sheets are sealed up by paving the composition on the peripheral portions of two glass sheets opposed to each other with a spacer therebetween. Thus, the production process is simplified. However, in this insulating glass, the glass sheets are not dislocated each other when a load is placed upon the glass sheets at normal temperature but the glass sheets are dislocated each other while a high-temperature sealing material is paved and cured especially when the insulating glass is produced or when the temperature of the outside air rises in summer or by sunlight after the insulating glass is formed into a construction material or the like because the composition which serves as a sealing material and resin spacer contains a small amount of a resin in rubber and hence, is easily deformed at high temperatures.

SUMMARY OF THE INVENTION

It is a first object of the present invention to provide a thermoplastic elastomer composition which has excellent steam permeation resistance and heat distortion resistance and is suitable for use as a sealing material and spacer for insulating glass.

It is a second object of the present invention to provide insulating glass which uses the thermoplastic elastomer composition as a sealing material and spacer, is produced easily, has excellent steam permeation resistance and is not deformed in the entire shape by the dislocation of the glass sheets when it is allowed to cool after the sealing material and spacer is paved, or after processing or at high temperatures in summer or the like.

It is a third object of the present invention to provide a process for producing insulating glass which enables a sealing material to be efficiently paved in a space between the peripheral portions of glass sheets and leveled to obtain good appearance and reduces the number of working steps to carry out efficient work.

It is a fourth object of the present invention to provide a nozzle for producing insulating glass which can be advantageously used in the above process for producing insulating glass.

The inventor of the present invention has conducted intensive studies to solve the above problems and have found that the above objects can be attained by a thermoplastic elastomer composition containing a continuous phase formed of a thermoplastic resin having a water vapor permeability below a predetermined value and a dispersion phase formed by dynamically crosslinking a rubber component having a water vapor permeability below a predetermined value after crosslinking, and insulating glass using the composition as a sealing material and spacer. Thus, the present invention has been accomplished based on this finding.

To attain the first object, the present invention provides a thermoplastic elastomer composition which is produced from a thermoplastic resin having a water vapor permeability of 100 g/m²·24 h or less (30 μm in thickness) and rubber having a water vapor permeability of 300 g/m²·24 h or less (30 μm in thickness) when crosslinked and which has a dispersion phase formed of a rubber composition at least part of which is dynamically crosslinked in the continuous phase of the thermoplastic resin.

To attain the second object, the present invention provides insulating glass which uses the thermoplastic elastomer composition as a sealing material and spacer.

To attain the third object, the present invention provides a process for producing insulating glass by charging a sealing material having a predetermined width into a space between the peripheral portions of at least two glass sheets which are opposed to each other in parallel at a predetermined interval to isolate the hollow layer from the outside air, the process comprising the steps of inserting in advance the leading end of a charging nozzle into a space between the peripheral portions of a plurality of glass sheets, contacting a slide plate provided at the top of the leading end portion of the nozzle to the peripheral portions of the plurality of glass sheets, discharging a sealing material from the leading end of the nozzle body at a predetermined rate, and moving at least one of the glass sheets and the nozzle body relative to the other to charge the sealing material from the leading end portion of the nozzle into the space between the peripheral portions of the glass sheets.

To attain the fourth object, the present invention provides a nozzle for producing insulating glass by inserting the leading end portion of the nozzle into a space between the peripheral portions of at least two glass sheets which are opposed to each other in parallel at a predetermined interval, and charging a sealing material from the leading end portion of the nozzle into the space between the peripheral portions of the glass sheets while at least one of the glass sheets and the nozzle body is moved relative to the other, wherein the leading end of the nozzle body has a width for positioning the interval between the plurality of glass sheets, and a slide plate which slides along the peripheral portions of the plurality of glass sheets and is provided at the top of the leading end portion.

BRIEF DESCRIPTION OF THE DRAWINGS

These and further features of the present invention will be apparent with reference to the following description and drawings, wherein.

DETAILED DESCRIPTION OF THE INVENTION

Figure 1A:
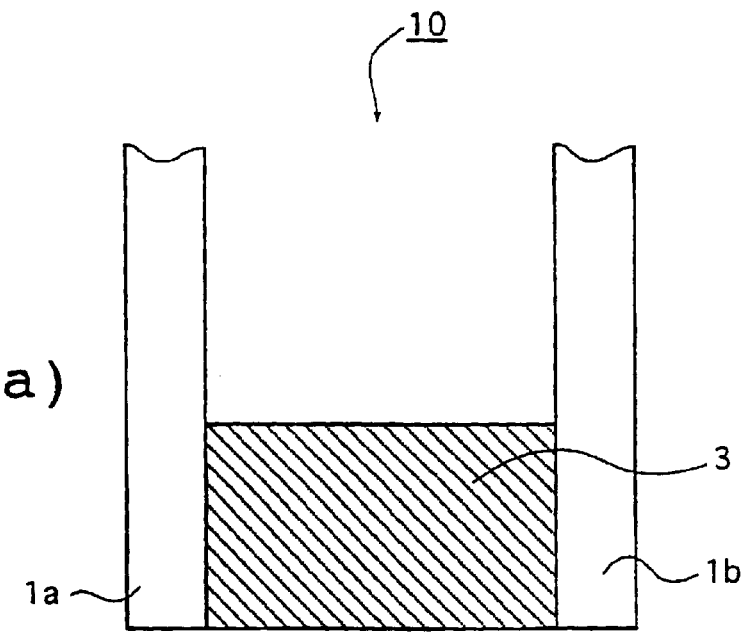
FIGS. 1(a) and (b) are schematic sectional views of insulating glass according to an embodiment of the present invention.

The present invention will be described in detail hereinunder.

The thermoplastic elastomer composition of the present invention (to be referred to as "composition of the present invention" hereinafter) is suitable for use as a sealing material and spacer for insulating glass and has a continuous phase formed of a thermoplastic resin and a dispersion phase formed of a rubber composition at least part of which is dynamically crosslinked. The dispersion phase is uniformly dispersed in the continuous phase.

A thermoplastic resin having a water vapor permeability of 100 g/m²·24 h or less when a sheet having a thickness of 30 μm is formed from the thermoplastic resin alone is used as the thermoplastic resin which is one of the components of the composition of the present invention.

Illustrative examples of the thermoplastic resin include polyolefin-based resins such as high-density polyethylene (HDPE), low-density polyethylene (LDPE), ultra high molecular weight polyethylene (UHMWPE), isotactic polypropylene, syndiotactic polypropylene and ethylene-propylene copolymer resins; polyamide-based resins such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer and nylon 66/PPS copolymer; polyester-based resins such as aromatic polyesters exemplified by polybutylene terephthalate (PBT) and polyethylene terephthalate (PET); polyether-based resins such as polyphenylene oxide (PPO), modified polyphenylene oxide (modified PPO), polysulfone (PSF) and polyether ether ketone (PEEK); polymethacrylate-based resins such as methyl polymethacrylate (PMMA) and ethyl polymethacrylate; polyvinyl-based resins such as a vinyl alcohol/ethylene copolymer (EVOH), polyvinylidene chloride (PVDC) and vinylidene chloride/methyl acrylate copolymer; fluororesins such as polyvinylidene fluoride (PVDF), polychlorofluoroethylene (PCTFE) and polyacrylonitrile resin (PAN); and the like.

Out of these, polyolefin-based resins, polyester-based resin, polyether-based resin and fluororesins having a heat distortion temperature of 50° C. or more are preferred because the composition of the present invention obtained therefrom has excellent moldability and excellent heat distortion resistance against the temperature of the outside air or the like when it is used as a sealing material and spacer for insulating glass which will be described hereinafter, so that a reduction in water vapor permeability caused by water absorption can be minimized.

The dispersion phase dispersed in the continuous phase of the composition of the present invention is formed of a rubber composition at least part of which is dynamically crosslinked. Rubber having a water vapor permeability of 300 g/m²·24 h or less when a sheet having a thickness of 30 μm is produced by crosslinking only a rubber component is used as a rubber component which is the main constituent ingredient of this dispersion phase. Illustrative examples of the rubber component include cyclic NR, ethylene propylene rubber (EPDM, EPM), polyisobutylene, IIR, Br-IIR, Cl-IIR, halide of a paramethyl styrene-polyisobutylene copolymer (X-IPMS), ethylene-vinyl acetate rubber (EVA), chlorinated polyethylene, chlorosulfonated polyethylene, acrylonitrile butadiene rubber and hydride thereof, hydrin rubber and the like. Out of these, ethylene propylene rubber, IIR, Br-IIR and X-IPMS are preferred from the viewpoints of heat resistance at the time of kneading with a resin, low water vapor permeability and crosslinking reactivity.

Further, a reinforcement, filler, softening agent, crosslinking agent, age resistor, processing aid and the like which are generally blended to improve the dispersibility, heat resistance and the like of the rubber composition and for other purposes may be suitably blended into the rubber composition forming the dispersion phase.

A combination of a thermoplastic resin forming the continuous phase and rubber which is the main constituent ingredient of the dispersion phase of the composition of the present invention is not particularly limited and at least one thermoplastic resin selected from the above thermoplastic resins and at least one rubber selected from the above rubbers may be used in combination.

The weight ratio of the thermoplastic resin composition to the rubber composition constituting the composition of the present invention is not particularly limited but preferably 85/15 to 15/85, more preferably 50/50 to 30/70.

The criticality of this ratio is dependent upon the volume ratio and viscosity ratio of the thermoplastic resin composition to the rubber composition.

The rubber composition is the dispersion phase and the thermoplastic resin composition is the continuous phase of the composition of the present invention. Even when the both components are simply kneaded together while they are molten, a thermoplastic elastomer composition having a dispersion structure of interest is not always obtained. The relationship between the melt viscosity of the thermoplastic resin composition to the melt viscosity of the rubber component at their kneading temperature is adjusted by controlling the volume ratio of the both components to be blended so that the value of $\alpha_1$ obtained from the following equation should become less than 1.

$$\alpha_1 = (\phi_R/\phi_P) \times (\eta_P/\eta_R)$$

where $\phi_R$ is the volume fraction of the rubber composition, $\phi_P$ is the volume fraction of the thermoplastic resin composition, $\eta_P$ is the melt viscosity (poise) of the rubber composition at a temperature and a shearing speed at which the thermoplastic resin composition and the rubber composition are kneaded together, and $\eta_R$ is the melt viscosity (poise) of the thermoplastic resin composition at a temperature and a shearing speed at which the thermoplastic resin composition and the rubber composition are kneaded together.

When the value of $\alpha_1$ is 1 or more, the dispersion structure of the composition of the present invention may be inverted and the rubber composition may be the continuous phase of the composition.

$0.5 \leq \eta_R/\eta_P \leq 3.0$ is preferred. Within this range, the rubber composition is dispersed in the thermoplastic resin as particles having a size of about 0.1 $\mu$m to several tens of $\mu$m.

In the present invention, the term "melt viscosity" means the melt viscosity of each component at an arbitrary temperature when it is kneaded. Since the melt viscosity of a polymer component changes according to temperature, shearing speed (sec$^{-1}$) and shearing stress, it is obtained from the following equation by flowing the polymer component in a molten state in a thin tube at an arbitrary temperature at which the component is molten, particularly at a temperature range at the time of kneading and measuring stress and shearing speed.

$$\eta = \sigma/\dot{\gamma}$$

where $\sigma$ is a shearing stress and $\dot{\gamma}$ is a shearing speed.

The capillary rheometer capillograph 1C of Toyo Seiki Co., Ltd. may be used as an example for the measurement of melt viscosity.

The composition of the present invention may contain a moisture absorbent. When the composition of the present invention is used as a sealing material or spacer for insulating glass, particularly a sealing material and spacer, it preferably contains a moisture absorbent.

The expression "sealing material and spacer" means that the composition of the present invention is used as a spacer arranged in a space between the peripheral portions of the opposed glass sheets of insulating glass to ensure the thickness of an air layer for the insulating glass and that the spacer is press-contacted to the glass sheets without paving a sealing material between the spacer and the glass sheets so that the composition of the present invention is used as a sealing material for isolating the air layer from the outside air. That is, when the composition of the present invention is used as a sealing material and spacer, it serves as a spacer and a sealing material at the same time.

The composition of the present invention may be used as a sealing material for insulating glass and used in combination with other spacer, or may be used as a spacer and used in combination with other sealing material.

The composition of the present invention preferably contains a moisture absorbent. When the composition of the present invention is used as a sealing material and spacer for insulating glass, it is effective because it can absorb moisture contained in the air layer formed between the two glass sheets, dry the air layer, absorb water entering from the outside of the insulating glass and prevent a rise in the dew point of air sealed in the air layer. The expression "dew point in the insulating glass" means the highest temperature at which dew condensation on the inner surface of the insulating glass is visually observed.

A moisture absorbent which is generally charged in the metal spacer or the like of insulating glass may be used as the moisture absorbent, as exemplified by synthetic zeolite, silica gel, alumina and the like.

The amount of the moisture absorbent is preferably 10 to 70 parts by weight based on 100 parts by weight of the total of polymer components (a thermoplastic resin and rubber) of the present invention. Within this range, a composition having excellent hygroscopicity can be obtained.

Further, the composition of the present invention preferably contains a steam permeable barrier resin (to be referred to as "barrier resin" hereinafter). The composition of the present invention has excellent steam permeation resistance because the thermoplastic resin which is the continuous phase of the composition and rubber which is the main constituent ingredient of the dispersion phase have a water vapor permeability below respective predetermined values. However, when the composition of the present invention contains a barrier resin, the steam permeation resistance of the obtained composition of the present invention is further improved.

The term "barrier resin" used herein means a resin which has a smaller water vapor permeability than that of the thermoplastic resin which is the continuous phase, can be a barrier by increasing its crystallinity even if it is the same type of a resin as the thermoplastic resin of the continuous phase, which is preferably kneaded into the continuous phase in layers in a lamellar form when it is kneaded into the thermoplastic elastomer composition of the present invention and which is desirably lamellar in shape with an aspect ratio of 10 to 500 (aspect ratio: a/b where a is the length of a long axis and b is the length of a short axis).

In insulating glass which uses the composition of the present invention as a sealing material and spacer which will be described hereinafter, the barrier resin is preferably existent in the continuous phase of the composition of the present invention and dispersed as a lamellar product parallel to the peripheral surfaces of the insulating glass. The barrier resin dispersed in layers is effective in preventing the permeation of steam and reducing water vapor permeability.

Illustrative examples of a resin component constituting the barrier resin include polyolefins such as high-density polyethylene (HDPE) and ultra high molecular weight polyethylene (UHMWPE), polyamide resins such as nylon 6, nylon 66 and aromatic nylon (MXD6), polyester resins such as polyethylene terephthalate (PET), polyvinyl resins such as ethylene-vinyl alcohol (EVOH), polyvinyl chloride resins, polyvinylidene chloride (PVDC) resins and the like. In the present invention, these barrier resins may be used alone or in combination of two or more.

When the composition of the present invention contains a barrier resin, the content of the barrier resin is suitably determined such that the melt viscosities and volume fractions of the thermoplastic elastomer composition which is the composition of the present invention excluding the barrier resin, and the barrier resin should satisfy the following expressions (1) and (2). The weight ratio of the above thermoplastic elastomer composition to the barrier resin is generally 90/10 to 50/50, particularly preferably 90/10 to 70/30.

$$\eta_d/\eta_m \geq 2.0 \quad (1)$$

$$\alpha_2 = \Phi_d/\Phi_m \times \eta_m/\eta_d < 1.0 \quad (2)$$

where $\eta_d$ is the melt viscosity (poise) of the barrier resin, $\eta_m$ is the melt viscosity (poise) of the thermoplastic elastomer composition, $\Phi_d$ is the volume fraction of the barrier resin, and $\Phi_m$ is the volume fraction of the thermoplastic elastomer composition.

In the expression (1), when the value of $\eta_d/\eta_m$ is less than 2, the barrier resin is finely dispersed in the thermoplastic elastomer composition while it is molten and kneaded and its function as a barrier becomes reduced. The value of $\eta_d/\eta_m$ is preferably 3 or more. In the expression (2), when $\alpha_2$ is less than 1, the barrier resin can be existent as a dispersion phase in the continuous phase formed of the thermoplastic elastomer composition, more specifically, in the thermoplastic resin composition forming the continuous phase of the thermoplastic elastomer composition.

A filler such as talc, calcium carbonate, mica or carbon black, tackifier such as rosin ester and coumarone resin, age resistor, thermal stabilizer, antioxidant, softening agent, processing aid agent and other additives may be added to the composition of the present invention in limits that do not impair the object of the present invention in order to improve fluidity, heat resistance, physical strength, cost performance and the like. Further, an inorganic pigment and organic pigment may be blended into the thermoplastic resin composition for coloration.

Moreover, an adhesion promoter may be added to the composition of the present invention to improve adhesion to glass. The adhesion promoter is a silane coupling agent such as vinylsilane, methacrylsilane, aminosilane, epoxysilane or mercaptosilane, or a polymer having a maleic acid group, carboxylic acid group, hydroxyl group or epoxy group. Specific examples of the adhesion promoter include maleic acid modified polyethylene, maleic acid modified polypropylene, maleic acid modified ethylene ethyl acrylate, epoxy modified styrene-butadiene copolymer, epoxy modified ethylene-vinyl acetate copolymer, ethylene-vinyl acetate copolymer and saponified products thereof.

When the chemical compatibilities of the above specific thermoplastic resin composition and rubber composition are different from each other, an appropriate compatibilizing agent is preferably used as a third component to compatibilize the both materials. The interfacial tension between the thermoplastic resin composition and the rubber composition is reduced by mixing a compatibilizing agent, with the result that the characteristic properties of the both compositions are developed more effectively as the particle diameter of the rubber composition forming the dispersion phase becomes very small. The compatibilizing agent is generally a copolymer having both structures of a resin component and a rubber component or either one of them, or a copolymer having an epoxy group, carboxyl group, carbonyl group, halogen group, amino group, oxazoline group or hydroxyl group which can react with a resin component or rubber component. They can be selected according to the types of the resin component and the rubber component to be mixed together.

General-purpose compatibilizing agents include a styrene-ethylene-butylene-styrene-based block copolymer (SEBS) and maleic acid modified product thereof, EPDM, EPM and maleic acid modified products thereof, EPDM/styrene and EPDM/acrylonitrile graft copolymer and maleic acid modified products thereof, styrene/maleic acid copolymer, reactive phenoxthine and the like.

When a compatibilizing agent is blended into the composition of the present invention, its amount is not particularly limited but preferably 0.5 to 20 parts by weight based on 100 parts by weight of the total of polymer components (the thermoplastic resin and rubber).

In the present invention, a vulcanizing agent, vulcanizing accelerator, vulcanization conditions (temperature and time) and the like used for the dynamic crosslinking of the rubber composition may be suitably determined according to the composition of the rubber composition used and are not particularly limited. A general rubber vulcanizing agent (crosslinking agent) may be used as the vulcanizing agent.

Illustrative examples of sulfur-based vulcanizing agents used as the rubber vulcanizing agent include powdery sulfur, precipitating sulfur, highly dispersible sulfur, surface treated sulfur, insoluble sulfur, dimorpholine sulfide, alkylphenol disulfide and the like.

When this sulfur-based vulcanizing agent is used, its amount is preferably 0.5 to 4 phr (parts by weight based on 100 parts by weight of the rubber component, this shall apply thereafter).

Organic peroxide-based vulcanizing agents include benzoyl peroxide, t-butylhydro peroxide, 2,4-dichlorobenzoyl peroxide, 2,5-dimethyl-2,5-di(t-butylperoxy)hexane and 2,5-dimethylhexane-2,5-di(peroxybenzoate).

When this organic peroxide-based vulcanizing agent is used, its amount is preferably 1 to 15 phr.

Further, phenol resin-based vulcanizing agents include bromides of alkylphenol resins, mixed crosslinking vulcanizing agents containing a halogen doner such as tin chloride or chloroprene and an alkylphenol resin.

When this phenol resin-based vulcanizing agent is used, its amount is preferably 1 to 20 phr.

Other vulcanizing agents include zinc oxide (about 5 phr), magnesium oxide (about 4 phr), litharge (about 10 to 20 phr), p-quinone dioxime, p-dibenzoylquinone dioxime, tetrachloro-p-benzoquinone, poly-p-dinitrosobenzene (about 2 to 10 phr) and methylindianiline (about 0.2 to 10 phr).

The composition of the present invention may contain a vulcanizing accelerator as required. A general vulcanizing accelerator such as aldehyde-ammonia-based, guanidine-based, thiazole-based, sulfenamide-based, thiuram-based, dithionate-based or thiourea-based general vulcanizing accelerator may be used in an amount of about 0.5 to 2 phr.

Illustrative examples of the vulcanizing accelerator include hexamethylenetetramine as the aldehyde-ammonia-based vulcanizing accelerator, diphenylguanidine as the guanidine-based vulcanizing accelerator, dibenzothiazyldisulfide (DM), 2-mercaptobenzothiazole and Zn salts and cyclohexylamine salts thereof as the thiazole-based vulcanizing accelerator, cyclohexylbenzothiazyl sulfenamide (CBS), N-oxydiethylenebenzothiazyl-2-sulfenamide, N-t-butyl-2-benzothiazole sulfenamide and 2-(thymolpolynildithio)benzothiazole as the sulfenamide-based vulcanizing accelerator, tetramethylthiuram disulfide (TMTD), tetraethylthiuram disulfide, tetramethylthiuram monosulfide (TMTM) and dipentamethylenethiuram tetrasulfide as the thiuram-based vulcanizing accelerator, Zn-dimethyl dithiocarbamate, Zn-diethyl dithiocarbamate, Zn-di-n-butyl dithiocarbamate, Zn-ethylphenyl dithiocarbamate, Tc-diethyl dithiocarbamate, Cu-dimethyl dithiocarbamate, Fe-dimethyl dithiocarbamate and pipecolinepipecolyl dithiocarbamate as the dithionate-based vulcanizing accelerator, and ethylene thiourea and diethyl thiourea as the thiourea-based vulcanizing accelerator.

A general rubber auxiliary such as zinc oxide (about 5 phr), stearic acid, oleic acid or Zn salt thereof (about 2 to 4 phr) may also be used as the vulcanizing accelerator.

The composition of the present invention is prepared by previously supplying a thermoplastic resin component and an unvulcanized rubber composition to a kneader such as a double-screw kneader to melt and knead these compositions and dispersing the rubber composition in the thermoplastic resin composition forming a continuous phase (matrix phase) as a dispersion phase (domain). Thereafter, a thermoplastic elastomer composition can be produced by adding a vulcanizing agent under kneading to dynamically crosslink the rubber composition. The addition of compounding additives to the thermoplastic resin composition or rubber composition may be carried out during kneading but preferably carried out before kneading. A vulcanizing agent is mixed into the rubber composition in advance so that the rubber composition can be crosslinked while the thermoplastic resin composition and the rubber composition are kneaded together.

The kneader used for the kneading of the thermoplastic resin composition and the rubber composition is not particularly limited and a screw extruder, kneader, Banbury mixer, double-screw kneading extruder and the like may be used. Particularly for the kneading of the thermoplastic resin composition and the rubber composition and the dynamic crosslinking of the rubber composition, a double-screw kneading extruder is preferably used. Two or more kneaders may be used to knead these compositions sequentially.

As for melt kneading conditions, the temperature may be higher than the melting temperature of the thermoplastic resin. When a barrier resin is blended, the temperature may be higher than the melting temperature of the thermoplastic resin and lower than the heat distortion temperature of the barrier resin. The shearing speed at the time of kneading is preferably 500 to 7,500 $sec^{-1}$. The total kneading time is 30 seconds to 10 minutes and the vulcanizing time after addition is preferably 15 seconds to 5 minutes.

The prepared thermoplastic elastomer composition is then extruded into a strand form from the kneading extruder, cooled with water or the like, pelletized by a pelletizer for resins and then may be molded. The high-temperature thermoplastic elastomer composition thus prepared may be directly paved and charged into a space surrounded by the peripheral portions of the glass sheets of the insulating glass and a previously installed spacer as a sealing material for the insulating glass.

Alternatively, the prepared thermoplastic elastomer composition may be molded into the form of a spacer by extrusion molding, injection molding or the like. In this case, when the high-temperature thermoplastic elastomer composition discharged from a molding machine is used, adhesion to the glass sheets and the spacer is advantageously increased.

When the composition of the present invention contains a barrier resin, pellets obtained by molding the thermoplastic elastomer composition prepared as described above and the pellets of the above barrier resin are mixed in a predetermined ratio. The mixing of the pellets is carried out by dry blending with a commonly used blender or the like, or by supplying the pellets into a kneader from independent feeders in a predetermined ratio.

The mixture of the both pellets is melt kneaded at a low shearing speed (for example, 30 $sec^{-1}$ or more and less than 300 $sec^{-1}$), such that the thermoplastic elastomer composition and the barrier resin are melt kneaded in a single-screw extruder and the resulting mixture is extruded from the end of the extruder or injection molded, and the resulting melt kneaded product is directly supplied into a molding machine to produce a sealing material and spacer. Alternatively, the kneaded product may be extruded into a strand form from the end of the extruder, pelletized and molded.

When the composition of the present invention is used as a sealing material, spacer, or a sealing material and spacer, the barrier resin is preferably aligned in lamellar layers parallel to the peripheral surfaces of the insulating glass. In order to align the barrier resin like this, it is effective to make flat the shape of the nozzle for extruding the composition of the present invention for injection or to set the shearing speed at the outlet of the extruder at 30 to 300 $s^{-1}$.

In the composition of the present invention obtained from the above components and by the above production process, the dynamically crosslinked rubber composition forms a dispersion phase in the thermoplastic resin composition forming a continuous phase. That is, in the above production process, the crosslinking of the rubber composition proceeds while the thermoplastic resin composition and the rubber composition are kneaded together so that the obtained composition contains the crosslinked rubber as a dispersion phase finely dispersed in the resin composition as a continuous phase.

In a composition obtained merely by kneading the thermoplastic resin with rubber, rubber is dispersed as fine particles immediately after they are kneaded and provided with large shearing force but rubber turns back to a large mass when kneading is stopped with the result that the rubber may form a continuous phase and the thermoplastic resin may be dispersed in the rubber. A composition having this structure has low heat distortion resistance because the rubber forms a continuous phase.

The composition of the present invention has excellent steam permeation resistance. The composition of the present invention in which rubber is finely dispersed in the thermoplastic resin has also excellent heat distortion resistance.

The composition of the present invention containing a moisture absorbent has excellent hygroscopicity.

The composition of the present invention comprising a thermoplastic resin having a heat distortion temperature of 70° C. or more as a continuous phase is excellent in heat distortion resistance and also processability when the composition of the present invention is processed into a sealing material or the like.

Further, the composition of the present invention containing a steam permeable barrier resin is more superior in steam permeation resistance.

A description is subsequently given of insulating glass which uses the composition of the present invention as a sealing material and spacer.

Figure 1B:
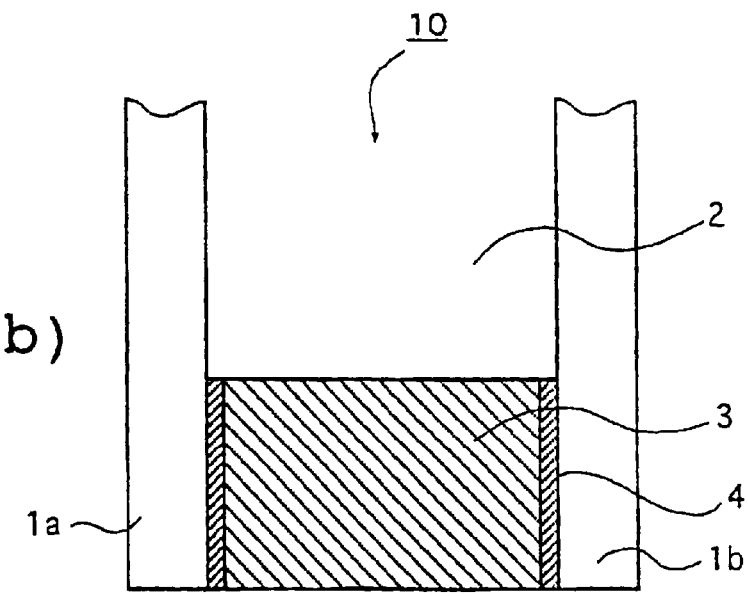

FIGS. 1(a) and 1(b) are schematic sectional views in a direction perpendicular to glass sheets of the insulating glass of the present invention. In the insulating glass 10 shown in FIGS. 1(a) and 1(b), a spacer 3 for determining the interval between two opposed glass sheets 1a and 1b is installed between the two glass sheets 1a and 1b to form an air layer 2 having a predetermined volume therebetween. This spacer 3 may be made from a metal such as aluminum and a sealing material made from the composition of the present invention may be installed as a separate unit, but the spacer 3 is preferably made from the composition of the present invention. The hardness of the spacer made from the composition of the present invention is 25 to 90 in terms of JIS A hardness. Within this range, even when stress is applied to the adhesive surfaces between the glass sheets and the spacer by a rise in the temperature of the air layer 2, it can be avoided that the glass is broken if bonding strength is high and the glass sheets and the spacer are separated from each other if bonding strength is insufficient. Further, within this range, the insulating glass is not deformed by the weight of the glass sheets.

The interval between the glass sheets 1a and 1b is generally about 6 mm or about 12 mm. The insulating glass 10 shown in FIGS. 1(a) and 1(b) comprises two glass sheets. The number of the glass sheets is not limited to two but two or more glass sheets may be used and the number of the glass sheets can be selected as required.

In the insulating glass of the present invention shown in FIGS. 1(a) and 1(b), the spacer 3 also serves as a sealing material for sealing up the space between the two glass sheets 1a and 1b from the outside air and holding the glass sheets. The spacer 3 prevents water from entering from the outside without using a primary sealing material, a secondary sealing material and the like and serves as a spacer and sealing material for holding the two glass sheets 1a and 1b at a predetermined interval.

The insulating glass of the present invention may have adhesive layers 4 between the spacer 3 which also serves as a sealing material and the glass sheets 1a and 1b as shown in FIG. 1(b). When the insulating glass of the present invention has the adhesive layers 4, adhesion between the spacer 3 and the glass sheet 1a or 1b can be improved, the entry of water from the outside of the insulating glass can be prevented, and a rise in the dew point of the air layer 2 can be suppressed.

A glass sheet for use in construction materials, vehicles or the like can be used as the glass sheet of the insulating glass of the present invention, as exemplified by glass which is generally used in windows, reinforced glass, wire-net glass, heat absorbing glass, heat reflecting glass, organic glass and the like. The thickness of the glass sheet is suitably determined.

An adhesive used in the adhesive layer 4 is a silane coupling agent such as vinylsilane, methacrylsilane, aminosilane, epoxysilane or mercaptosilane, or a polymer having a maleic acid group, carboxylic acid group, hydroxyl group, epoxy group or the like. Illustrative examples of the adhesive include maleic acid modified polyethylene, maleic acid modified polypropylene, maleic acid modified ethylene ethyl acrylate, epoxy modified styrene-butadiene copolymer, epoxy modified ethylene-vinyl acetate copolymer, ethylene-vinyl acetate copolymer and saponified products thereof. Out of these, olefin-vinyl acetate copolymers are preferred. Illustrative examples of the olefin include ethylene, propylene, butene and the like. Out of these, an ethylene-vinyl acetate copolymer is preferred from the viewpoint of adhesion to glass and water resistance. The above olefin-vinyl acetate copolymer is preferably saponified because the saponified product has high reactivity and improved adhesion.

The insulating glass of the present invention can be basically produced by extruding the composition of the present invention through a nozzle or the like connected to an extruder into a space between two fixed parallel glass sheets and bonding it to the glass sheets. The inner sides of the peripheral portions of the glass sheets 1a and 1b to which the spacer 3 is bonded can be coated with a primer as required and further an adhesive as required. As the case may be, the composition of the present invention is extruded onto the inner side of the peripheral portion of one of the two glass sheets and the other glass sheet is press-bonded to the composition of the present invention before the composition does not become cool. To coat the primer and the adhesive, they may be coated manually with an applicator or the like, or automatically using a robot for extruding the primer and the adhesive.

Particularly, the composition of the present invention and the adhesive are co-extruded by an extruder such that the adhesive forms an outer layer and the composition of the present inventor forms an inner layer and then molded into a spacer having a predetermined shape. Alternatively, the extruded composition of the present invention and the extruded adhesive may be directly discharged into the space between the peripheral portions of the glass sheets.

The composition of the present invention for forming a spacer, which has a high temperature after kneading, is preferably used even when it is molded into a spacer and installed between the glass sheets and even when it is directly discharged into the space between the glass sheets from an extruder. This is because strong adhesion between the spacer and the glass sheets can be obtained.

The insulating glass of the present invention constituted as described above is produced very easily because the number of production steps is greatly reduced compared with conventional insulating glass which is produced using a metal spacer and a sealing material.

Since the composition of the present invention is used as a sealing material and spacer, it does not take long to cure it unlike the conventional two-liquid type sealing material and hence, productivity is high. Since the composition of the present invention has excellent steam permeation resistance as described above, the insulating glass of the present invention has a low dew point. Further, since the composition of the present invention has excellent heat distortion resistance, even when the temperature of the glass sheets becomes high due to the temperature of the outside air or the like, the insulating glass is not deformed by the dislocation of the glass sheets.

In the insulating glass which uses the composition of the present invention containing a moisture absorbent and a barrier resin, the air layer can be held while it is dry, the entry of water from the outside can be prevented, and the dew point is maintained at a low level.

Further, out of the above processes for producing the insulating glass of the present invention, preferred is a process which comprises the steps of inserting in advance the leading end of the charging nozzle into the space between the peripheral portions of a plurality of glass sheets, contacting a slide plate provided at the top of the leading end portion of the nozzle to the peripheral portions of the plurality of glass sheets, discharging a sealing material from the leading end of the nozzle body at a predetermined speed, and moving at least either one of the glass sheets and the nozzle body relative to the other to charge the sealing material into the space between the peripheral portions of the glass sheets from the leading end of the nozzle. According to this process, the sealing material can be efficiently paved in the space between the peripheral portions of the glass sheets and the sealing material can be leveled to obtain good appearance, and efficient work can be carried out by reducing the number of working steps.

Further, a production nozzle having a width for positioning the interval between the plurality of glass sheets at the leading end of the nozzle body and having a slide plate which slides along the peripheral portions of the plurality of glass sheets at the top of the leading end portion is preferably used in this process.

This process will be described hereinunder with reference to FIGS. 2 to 6.

Figure 2:
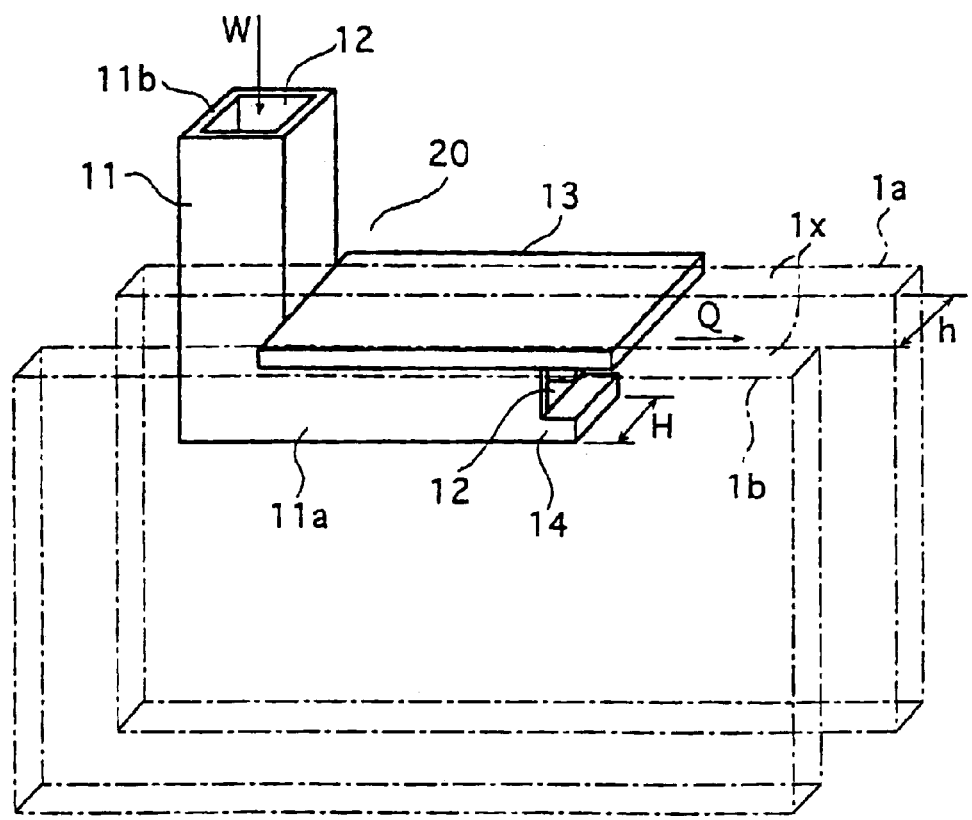
FIG. 2 is a perspective view of a nozzle for producing insulating glass of the present invention.
Figure 3:
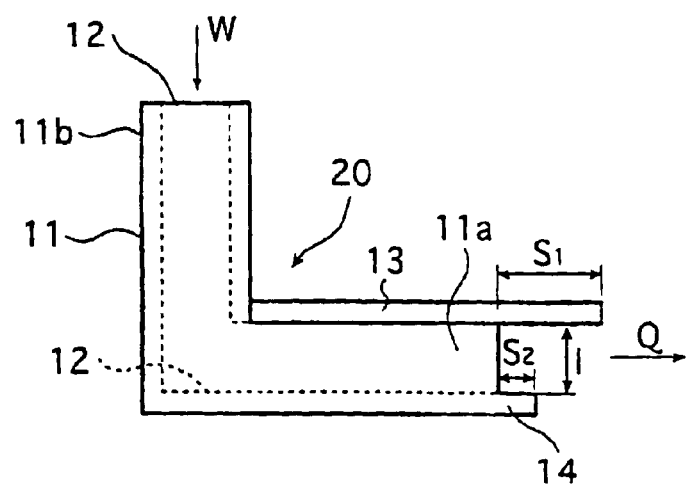
FIG. 3 is a side view of the nozzle for producing insulating glass of the present invention.
Figure 4:
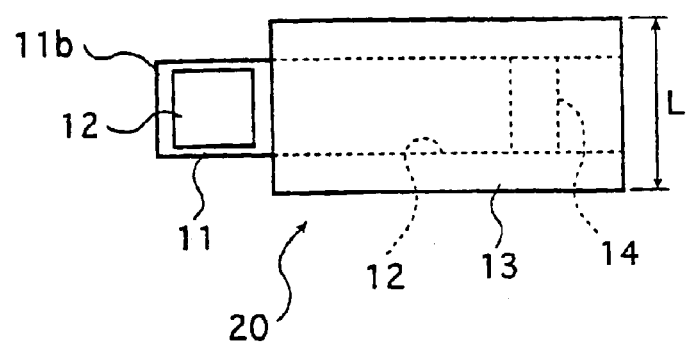
FIG. 4 is a plan view of the nozzle for producing insulating glass of the present invention.

FIG. 2 is a perspective view of a nozzle 20 for producing insulating glass which is inserted between the peripheral portions of two glass sheets 1a and 1b which are opposed to each other in parallel and held by an unshown jig or the like, FIG. 3 is a side view of the production nozzle 20 and FIG. 4 is a plan view of the production nozzle 20.

The production nozzle 20 has a passage 12 for discharging a sealing material W in a nozzle body 11 having an L-shaped section, at least the leading end portion 11a of the nozzle 20 has a width H for positioning the interval h between a plurality of glass sheets 1a and 1b, and a slide plate 13 which slides along the peripheral portions 1x of the plurality of glass sheets 1a and 1b is integrally provided on the upper surface of the leading end portion 11a.

The slide plate 13 projects along the discharge direction (direction shown by an arrow Q) of the sealing material W, and a guide plate 14 is formed at a lower end portion at the leading end of the nozzle body 20 in such a manner that the guide plate 14 is substantially parallel to the slide plate 13 and projects along the discharge direction of the sealing material W. The rear end portion 11b of the nozzle body 11 is connected to an unshown sealing material W feeder.

In the process for producing the insulating glass using this production nozzle 20, as shown in FIG. 2, the leading end portion 11a of the nozzle body 11 is first inserted into the space between the peripheral portions of two glass sheets 1a and 1b which are opposed to each other in parallel at a predetermined interval and held by an unshown jig or the like, and the sealing material W is charged into the space between the peripheral portions of the glass sheets from the leading end portion 11a of the nozzle at a predetermined delivery pressure (for example, 15 MPa) or a predetermined delivery rate (for example, 2,000 g/min) while at least one of the glass sheets 1a and 1b and the nozzle body 11 is moved relative to the other.

That is, the nozzle body 11 is moved along the peripheral portions 1x of the glass sheets 1a and 1b while the glass sheets 1a and 1b are fixed at predetermined positions, or the glass sheets 1a and 1b are moved at a predetermined speed while the nozzle body 11 is fixed. Or the nozzle body 11 and the glass sheets 1a and 1b are moved in opposite directions at the same speed, while the sealing material W is supplied into the discharge passage 12 in the nozzle body 11 from the sealing material W feeder and charged into the space between the peripheral portions of the glass sheets 1a and 1b.

Figure 5:
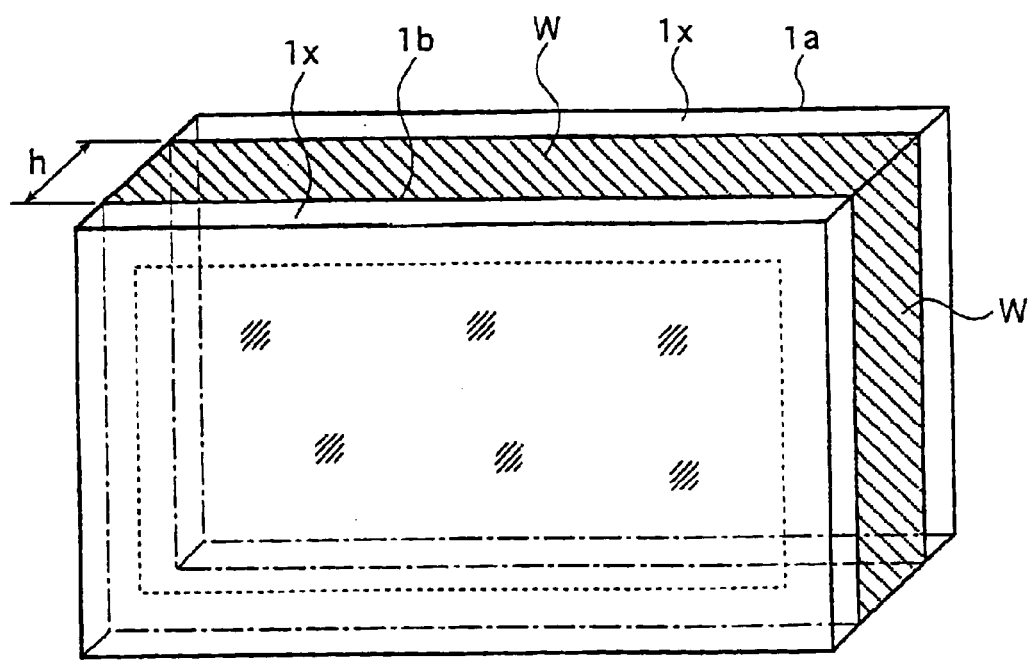
FIG. 5 is a perspective view showing that a sealing material is charged into a space between the peripheral portions of two glass sheets.

When the sealing material W is charged while at least one of the glass sheets 1a and 1b and the nozzle body 11 is moved relative to the other, the slide plate 13 provided at the top of the leading end portion of the nozzle body 11 is contacted to the peripheral portions 1x of the plurality of glass sheets 1a and 1b and slid (the sealing material Q is flatly pressed with a so-called knife), whereby the sealing material W at the peripheral portions 1x of the glass sheets 1a and 1b can be leveled, and at the same time, the lower side of the sealing material in the space between the glass sheets 1a and 1b can be leveled by the guide plate 14 provided at the low end portion at the leading end of the nozzle body 11 as shown in FIG. 5.

The sealing material used in this process preferably has an MFR (melt flow rate) of 20 to 500 g/10 min.

According to the above process, the sealing material W can be efficiently paved in the space between the peripheral portions of the glass sheets 1a and 1b by charging the sealing material W into the space between the peripheral portions of the glass sheets 1a and 1b from the leading end of the nozzle body 11 and leveled to obtain good appearance, and efficient work can be carried out by reducing the number of working steps.

In the above process, the method of charging the sealing material W into the space between the two glass sheets 1a and 1b has been described. However, the sealing material W can be charged into spaces among two or more glass sheets by transforming and processing the nozzle body 11.

EXAMPLE

The following examples are given to further illustrate the thermoplastic elastomer composition, insulating glass, a process for producing the insulating glass and a nozzle of the present invention.

Examples 1 to 10 and Comparative Examples 1 and 2

Rubber shown in Table 1 was first pelletized by a rubber pelletizer at about 100° C., and then rubber, a matrix resin, age resistor, filler and tackifier were dry blended in blending ratios for Examples 1 to 10 and Comparative Examples 1 and 2, each of the resulting blends being injected into a double-screw kneader to be melt kneaded. Thereafter, and a vulcanizing agent was added from an intermediate injection port to carry out dynamic vulcanization. At this point, the double-screw kneader was set at a temperature of 230° C. and a shearing speed of 1,000 s$^{-1}$. Further, a moisture absorbent and an adhesive promoter were injected from a final injection port of the double-screw kneader.

A thermoplastic elastomer composition extruded into a strand form from the double-screw kneader was cooled with water and pelletized by a resin pelletizer.

Two square glass sheets having 300 mm per side were fixed in parallel to each other at an interval of 6 mm, the above material was paved in a space between the peripheral portions of the two glass sheets while it was extruded from a nozzle and molded to form insulating glass. The pellet was molded into a 30 μm-thick film by press molding as a sample used for the measurement of water vapor permeability.

As for Examples 5 and 6, the thermoplastic elastomer compositions prepared by the above method were dry blended with a barrier resin immediately before extrusion molding for the formation of insulating glass to form insulating glass by the same method as described above.

Comparative Example 3

Insulating glass was produced in the same manner as in the above Examples and Comparative Examples except that a vulcanizing agent for rubber was not added during blending.

(1) Water Vapor Permeability

Figure 6:
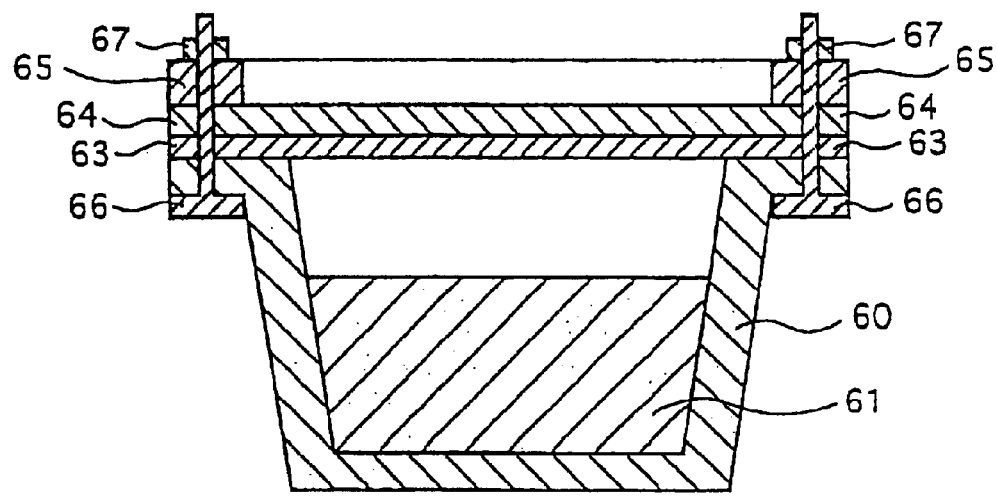
FIG. 6 is a sectional view of a cup for measuring water vapor permeability.
Figure 7:
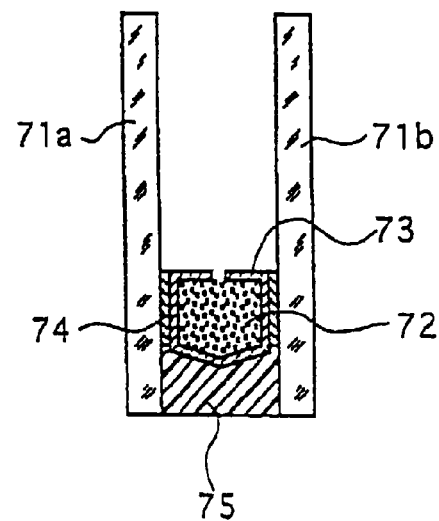
FIG. 7 is a diagram for explaining the insulating glass production process of the prior art.

Six liters of water which is half the volume of a stainless steel cup 60 shown in FIG. 6 is injected into the stainless steel cup 60. An upper opening in the cup 60 is covered with a sample sheet 63 (30 μm in thickness) obtained by cutting the sample sheet obtained in Examples 1 to 10 and Comparative Examples 1 to 3, a sintered metal plate 64 is placed upon the top of the sample sheet 63, and they are fastened together with a bolt 66 and a nut 67 through affixing member 65. This cup is left to stand in the atmosphere at a temperature of 25° C. and the total weight of the cup is measured after 1 month. A reduction in the weight of the cup per 24 hours is calculated and water vapor permeability is calculated from the following expression water vapor permeability [(g/24 hr·m$^2$)]=M/(T·A) where A is a permeation area [m$^2$], T is a test time [day] and M is a weight reduction [g].

(2) The heat distortion temperature (load deflection temperature) of a thermoplastic resin used as a continuous phase is measured at 0.45 MPa in accordance with JIS K 7207.

(3) Measurement of Dew Point

The dew point is measured after the end of the following tests based on the test standards of classes I to III (classification by acceleration durability) specified in JIS R 3209.

class I: 7 days of moisture resistance and light resistance test+12 cycles of cooling and heating repetition test class II: 14 days of moisture resistance and light resistance test+24 cycles of cooling and heating repetition test class III: 42 days of moisture resistance and light resistance test+72 cycles of cooling and heating repetition test In the table, ○ indicates that the dew point is −35° C. or less, Δ indicates that the dew point is more than −35° C. and less than −30° C. and x indicates that the dew point is −30° C. or more.

(4) Dislocation at the Time of Processing

One glass sheet of the insulating glass produced in Examples and Comparative Examples is fixed and a load of 8 kg is placed upon the other glass sheet to measure the amount of downward movement of the glass sheet that is loaded at a temperature of 50° C. A glass sheet which is moved 0.5 mm or less a day is expressed by ○ and a glass sheet which is moved more than 0.5 mm is expressed by x.

As a result, the thermoplastic elastomer composition as in Comparative Examples 1 and 2 which is produced from the rubber or thermoplastic resin with more water vapor permeability has low steam permeation resistance, and when such a thermoplastic elastomer composition is used to form insulating glass, it has a high dew point due to steam entry into the insulating glass through the seal.

Further, in Comparative Example 3, the amount of rubber was large and the value of $\alpha_1$ exceeded 1, so that the continuous phase formed by rubber and the dispersion phase formed by the resin were constructed into layer. Since the rubber forming the continues phase has a low heat distortion temperature, the rubber could not bear the load of glass at the time of processing, resulting in dislocation.

TABLE 1

(part 1)

| | Example 1 | Example 2 | Example 3 | Example 4 | Example 5 | Example 6 | Example 7 |
|---|---|---|---|---|---|---|---|
| matrix resin | | | | | | | |
| PET | | | | | | | |
| HDPE | 30 | 30 | 30 | 30 | 30 | 30 | 50 |
| PS | | | | | | | |
| rubber | | | | | | | |
| modified butyl rubber (Br-IPMS) | 70 | 70 | 70 | 70 | 70 | 70 | 50 |
| EPDM | | | | | | | |
| IR | | | | | | | |
| barrier resin | | | | | | | |
| HDPE | | | | | | 10 | 20 |
| vulcanizing system | | | | | | | |
| ZnO | 3.5 | 3.5 | 3.5 | 3.5 | 3.5 | 3.5 | 2.5 |
| zinc stearate | 1.4 | 1.4 | 1.4 | 1.4 | 1.4 | 1.4 | 1 |
| stearic acid | 0.7 | 0.7 | 0.7 | 0.7 | 0.7 | 0.7 | 0.5 |
| sulfur | | | | | | | |
| NS | | | | | | | |
| phenol bromide | | | | | | | |
| age resistor | | | | | | | |
| RD | 1.4 | 1.4 | 1.4 | 1.4 | 1.4 | 1.4 | 1 |
| moisture absorbing filler | | | | | 50 | 50 | 50 |
| zeolite 1 | 50 | 50 | 25 | | | | |
| zeolite 2 | | | | 50 | | | |
| filler tackifier | | | | | | | |
| adhesion promoter | | | | | | | |

TABLE 1-continued (part 1 continued)

| | | | | | | | |
|---|---|---|---|---|---|---|---|
| (epoxysilane) | | | | | | | |
| talc | 50 | 50 | 50 | 50 | 50 | 50 | 50 |
| rosin ester | 50 | 50 | 50 | 50 | 50 | 50 | 50 |
| silane coupling agent | 2 | 0.5 | 2 | 2 | 2 | 2 | 2 |
| steam permeability of resin*[1] | 9 | 9 | 9 | 9 | 9 | 9 | 9 |
| steam permeability of rubber*[1] | 82 | 82 | 82 | 82 | 82 | 82 | 82 |
| heat deformation temperature of matrix resin (° C.) | 112 | 112 | 112 | 112 | 112 | 112 | 112 |
| $\alpha_1$ | 0.93 | 0.93 | 0.93 | 0.93 | 0.93 | 0.93 | 0.40 |
| $\alpha_1$ | — | — | — | — | 0.003 | 0.005 | — |
| $\eta_d/\eta_m$ | — | — | — | — | 3.8 | 3.8 | — |
| characteristic properties of material steam permeability | 38 | 37 | 38 | 38 | 25 | 16 | 24 |
| characteristic properties of multi-layer glass JIS R-3209 | | | | | | | |
| class 1 | ○ | ○ | ○ | ○ | ○ | ○ | ○ |
| class 2 | ○ | ○ | ○ | ○ | ○ | ○ | ○ |
| class 3 | ○ | Δ | Δ | ○ | ○ | ○ | ○ |
| dislocation at the time of processing | ○ | ○ | ○ | ○ | ○ | ○ | ○ |

(part 2)

| | Example 8 | Example 9 | Example 10 | Comparative Example 1 | Comparative Example 2 | Comparative Example 3 |
|---|---|---|---|---|---|---|
| matrix resin | | | | | | |
| PET | | | 30 | | | |
| HDPE | 70 | 30 | | 30 | | 5 |
| PS | | | | | 30 | |
| rubber | | | | | | |
| modified butyl rubber (Br-IPMS) | 30 | | 70 | | | 95 |
| EPDM | | 70 | | 70 | 70 | |
| IR | | | | | | |
| barrier resin | | | | | | |
| HDPE | | | | | | |
| vulcanizing system | | | | | | |
| ZnO | 1.5 | 3.5 | 3.5 | 3.5 | 3.5 | |
| zinc stearate | 0.6 | | 1.4 | 0.7 | 1.4 | |
| stearic acid | 0.3 | 0.7 | 0.7 | 2.1 | 0.7 | |
| sulfur | | | | 1.4 | | |
| Ns | | | | 0.7 | | |
| phenol bromide | | 8.4 | | | | |
| age resistor | | | | | | |
| RD | 0.6 | 1.4 | 1.4 | 1.4 | 1.4 | 2 |
| moisture absorbing filler | | | | | | |
| zeolite 1 | 50 | 50 | 50 | 50 | 50 | 50 |
| zeolite 2 | | | | | | |
| filler tackifier | | | | | | |
| adhesion promoter (epoxysilane) | | | | | | |
| talc | 50 | 50 | 50 | 50 | 50 | 50 |
| rosin ester | 50 | 50 | 50 | 50 | 50 | 50 |
| silane coupling agent | 2 | 2 | 2 | 2 | 2 | 2 |
| steam permeability of resin*[1] | 9 | 9 | 10 | 9 | 840 | 9 |
| steam permeability of rubber*[1] | 82 | 157 | 82 | 1720 | 157 | 82 |
| heat deformation temperature of matrix resin (° C.) | 112 | 112 | 191 | 112 | 88 | — |
| $\alpha_1$ | 0.03 | 0.93 | 0.98 | 0.90 | 0.89 | 7.6 |
| $\alpha_1$ | — | — | — | — | — | — |
| $\eta_d/\eta_m$ | — | — | — | — | — | — |
| characteristic properties of material steam permeability | 16 | 51 | 39 | 100 | 319 | 82 |
| characteristic properties of multi-layer glass | | | | | | |

TABLE 1-continued

| JIS R-3209 | | | | | | |
|---|---|---|---|---|---|---|
| class 1 | ○ | ○ | ○ | ○ | Δ | ○ |
| class 2 | ○ | ○ | ○ | Δ | x | ○ |
| class 3 | ○ | ○ | ○ | x | x | ○ |
| dislocation at the time of processing | ○ | ○ | ○ | ○ | ○ | x |

*1(g/m$_2$ · 24 h)

Examples 11 and 12

The thermoplastic elastomer composition of Example 1 as an inner layer and maleic acid modified EEA or ethylene-vinyl acetate saponified product as an outer layer were co-extruded at about 200° C. to form a spacer and insulating glass was produced in the same manner as in Example 1. The thickness of the obtained adhesive layer was about 20 μm.

The characteristic properties of the insulating glass were measured and evaluated in the same manner as in Example 1. Results are shown in Table 2.

Example 13

A primer was prepared by dissolving an ethylene-vinyl acetate saponified product in toluene in a solid content of 10% This primer was coated on a glass sheet with a brush and left to stand for 15 minutes and then insulating glass was produced in the same manner as in Example 1. Thereafter, the characteristic properties of the insulating glass were evaluated in the same manner as in Example 1. Results are shown in Table 2.

TABLE 2

| | Example 11 | Example 12 | Example 13 |
|---|---|---|---|
| thermoplastic elastomer composition layer | material of Example 1 | material of Example 1 | material of Example 1 |
| adhesive layer | maleic acid modified EEA | ethylene-vinyl acetate saponified product | ethylene-vinyl acetate saponified product |
| coating of adhesive | double-layer coextrusion molding | double-layer coextrusion molding | primer coating |
| characteristic properties of insulating glass JIS R-3209 | | | |
| class 1 | ○ | ○ | ○ |
| class 2 | ○ | ○ | ○ |
| class 3 | ○ | ○ | ○ |
| dislocation at the time of processing | Δ | ○ | ○ |
| | ○ | ○ | ○ |

<Components in Tables>
PET: J125 by Mitsui PET Co., Ltd.
HDPE (matrix): Hizex 2100J by Mitsui Chemical Co., Ltd.
PS: Stylon 666 R by Asahi Chemical Industry Co., Ltd.
modified butyl rubber: Exxpro89-4 by Eccson Co., Ltd.
EPDM: EPT 3045 by Mitsui Chemical Co., Ltd.
IR: Nipole 2200 by Nippon Zeon Co., Ltd.
HDPE (barrier resin): Ryubmer 5000 by Mitsui Chemical Co., Ltd.
ZnO: zinc oxide No. 3 by Seido Kagaku Co., Ltd.
zinc stearate: zinc stearate by Seido Kagaku Co., Ltd.
stearic acid: bead stearic acid by NOF Corporation
sulfur: powdery sulfur by Karuizawa Seirensho Co., Ltd.
NS: Nokusera NS by Ohuchi Shinko Kagaku Co., Ltd.
phenol bromide: Tackirol 250-1 by Taoka Kagaku Co., Ltd.
RD: Antigen-RD-F by Sumitomo Chemical Co., Ltd.
zeolite 1: Zeoram 4A by Tosoh Corporation
zeolite 2: Zeoram 3 by Tosoh Corporation
talc: Talc F by Nippon Talc Co., Ltd.
rosin ester: Pensel AD by Arakawa Kagaku Co., Ltd.
silane coupling agent: A-174 by Nippon Unicar Co., Ltd.
maleic acid modified EEA: AR-201 by Mitsui-Dupont Polychemical Co., Ltd.
ethylene-vinyl acetate saponified product: Dumiran C1550 by Takeda Chemical Industries, Ltd.

Examples 14 to 16 and Comparative Example 4

A sealing material was produced according to formulations shown in Table 3 below in the same manner as in Example 1. The steam permeabilities of the used resin and the used rubber were 9 g/24 hr·m$^2$ and 82 g/24 hr·m, respectively, and the water vapor permeability of the produced thermoplastic elastomer composition for sealing the insulating glass was 38 g/24 hr·m$^2$.

TABLE 3

| | | Example |
|---|---|---|
| matrix resin | HDPE | 30 |
| Rubber | modified butyl rubber | 70 |
| vulcanizing system | ZnO | 3.5 |
| | zinc stearate | 1.4 |
| | stearic acid | 0.7 |
| Age resistor | RD | 1.4 |
| moisture absorbing filler | zeolite 1 | 50 |
| filler | talc | 50 |
| tackifier | rosin ester | 50 |
| adhesive promoter | ethylene-vinyl acetate copolymer saponified product | 10 |

The sealing material produced by the above method had an MFR at 230° C. of 100 g/min. The produced sealing material pellets were injected into a simplified extruder, a nozzle was inserted into a space between two glass sheets at 230° C., and the sealing material was charged into the space at a delivery rate of 2,000 g/min to produce the following insulating glass production of insulating glass size of glass sheet
    thickness of glass sheet
    type of glass sheet float glass
    interval between glass sheets h: 6 mm
    size of nozzle H: 5 mm
        L: 15 mm
        l: 5 mm
        $S_1$: 5 mm
        $S_2$: 2 mm Table 4 below shows experimental results obtained by the comparison of the leveled surfaces of the sealing material W by the shape of the discharge port of the nozzle body 11 and adhesion to the surface of glass between Examples 14, 15 and 16 of the present invention and the prior art (Comparative Example 4).

As obvious from the experimental results, it has been found that the upper and lower leveled surfaces of the sealing material are better and the adhesion of the sealing material to glass is better when the slide plate and the guide plate are provided at the leading end of the nozzle body 11.

TABLE 4

| | | Example 14 | Example 15 | Example 16 | Comparative Example 4 |
|---|---|---|---|---|---|
| shape of discharge port of nozzle | | | | | no sliding portion |
| upper and lower leveled surfaces | upper surface | Smooth ◎ | Smooth ◎ | almost smooth ○ | cut portion of glass is not flat x |
| | lower surface | Smooth ◎ | almost smooth ○ | almost smooth ○ | becomes wavy x |
| adhesion to glass surface | | adhered to entire surface ◎ | almost adhered to entire surface ○ | almost adhered to entire surface ○ | partly not adhered Δ |

The thermoplastic elastomer composition of the present invention has excellent steam permeation resistance and heat distortion resistance and is suitable for use as the raw material of a sealing material and spacer for insulating glass when a thermoplastic resin and rubber having a low water vapor permeability are used and the thermoplastic resin is used as a continuous phase.

The insulating glass of the present invention which uses the thermoplastic elastomer composition of the present invention as a sealing material and spacer has excellent heat distortion resistance and an air layer having a sufficiently low dew point. Further, the insulating glass of the present invention can be produced very easily because the number of production steps is much smaller than that of the conventional insulating glass.

Further, according to the process of the present invention, since a sealing material is charged into a space between the peripheral portions of glass sheets using a production nozzle having a slide plate which slides along the peripheral portions of a plurality of glass sheets at the top of the leading end portion of the nozzle body as described above, the sealing material can be efficiently paved in the space between the peripheral portions of the glass sheets and can be directly adhered to the glass sheets, and the sealing material at the peripheral portions of the glass sheets can be leveled to obtain good appearance, and efficient work can be carried out by reducing the number of working steps.

Further, the production nozzle of the present invention can be advantageously used in this production process.

What is claimed is:

1. A process for producing insulating glass by charging a sealing material having a predetermined width into a space between the peripheral portions of at least two glass sheets which are opposed to each other in parallel at a predetermined interval to isolate a hollow layer from the outside air, the process comprising the steps of:
    inserting in advance the leading end of a charging nozzle into the space between the peripheral portions of a plurality of glass sheets;
    contacting a slide plate provided at the top of the leading end portion of the nozzle to the peripheral portions of the plurality of glass sheets;
    discharging the sealing material from the leading end of the nozzle body at a predetermined rate; and
    moving at least one of the glass sheets and the nozzle body relative to the other to charge the sealing material into the space between the peripheral portions of the glass sheets from the leading end of the nozzle.

2. The process for producing insulating glass according to claim 1, wherein the sealing material at the peripheral portions of the plurality of glass sheets is leveled by the slide plate provided at the top of the leading end portion of the nozzle body and the lower side of the sealing material in the space between the plurality of glass sheets is leveled by a guide plate provided at a lower end portion at the leading end of the nozzle body when the sealing material is charged into the space between the peripheral portions of the glass sheets.

3. The process for producing insulating glass according to claim 1, wherein the sealing material and spacer comprises a thermoplastic elastomer composition produced from a thermoplastic resin having a water vapor permeability of 100 g/m²·24 h or less (30 μm in thickness) and rubber having a water vapor permeability of 300 g/m²·24 h or less (30 μm in thickness) when crosslinked, said composition having a dispersion phase formed of a rubber composition at least part of which is dynamically crosslinked in the continuous phase of the thermoplastic resin.

\* \* \* \* \*

UNITED STATES PATENT AND TRADEMARK OFFICE
CERTIFICATE OF CORRECTION

| | | |
|---|---|---|
| PATENT NO. | : 6,911,103 B2 | Page 1 of 1 |
| APPLICATION NO. | : 10/270069 | |
| DATED | : June 28, 2005 | |
| INVENTOR(S) | : Yukio Koizumi et al. | |

It is certified that error appears in the above-identified patent and that said Letters Patent is hereby corrected as shown below:

Title Page:

"Related U.S. Application Data" should read:

Item -- (62) Divisional of application No. 09/420,410, filed on October 19, 1999, now Pat. No. 6,491,992. --

Column 1:

Lines 7 and 8, "Ser. No. 09/639,889" should read -- Ser. No. 09/420,410 --.

Signed and Sealed this

Sixth Day of March, 2007

JON W. DUDAS
*Director of the United States Patent and Trademark Office*